Patented Nov. 26, 1940

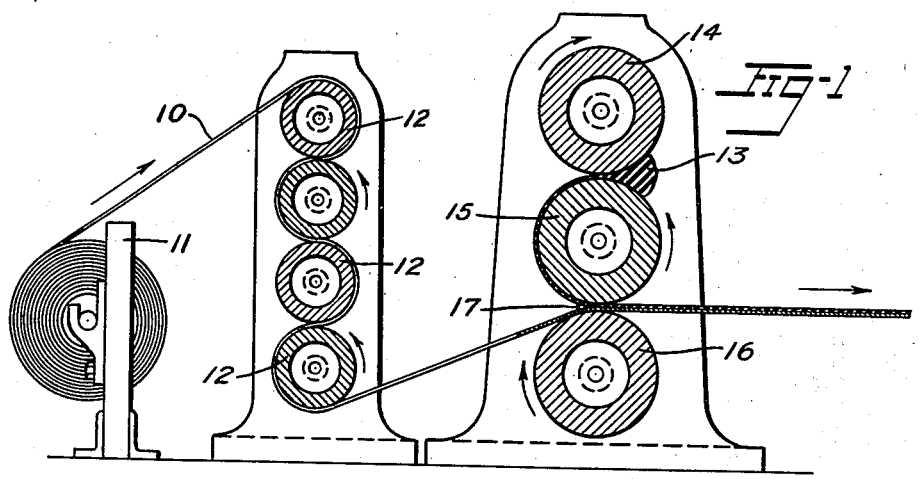
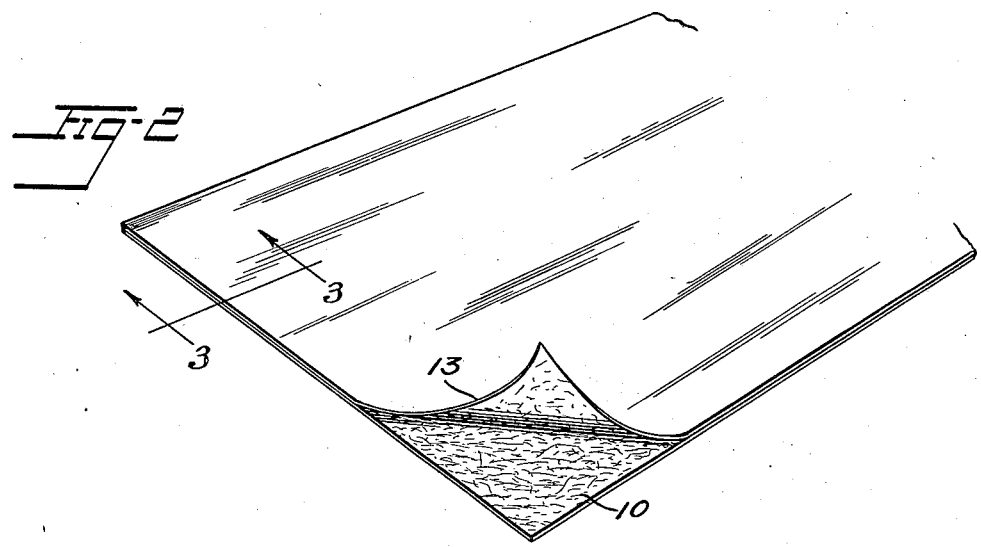
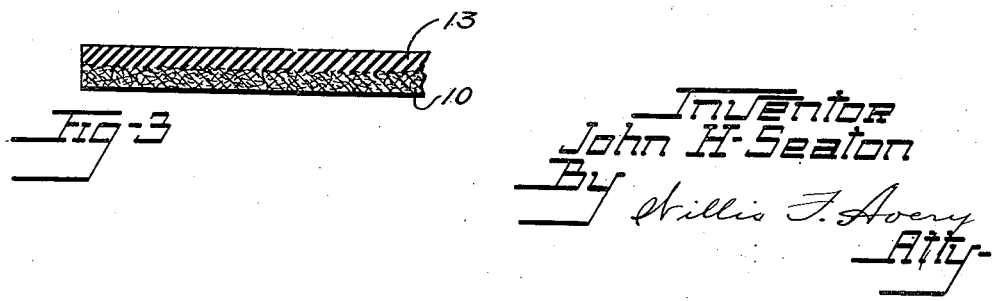

2,222,956

UNITED STATES PATENT OFFICE 2,222,956

COATED PAPER

John H. Seaton, Akron, Ohio, assignor to The B. F. Goodrich Company, New York, N. Y., a corporation of New York Application October 20, 1937, Serial No. 170,036

1 Claim. (Cl. 154—50)

This invention relates to a new method of coating paper with a polyvinyl halide coating.

One object of this invention is to provide a method whereby a film of uniform thickness may be applied to paper. Other objects are to reduce the expense of coating paper, to obviate the use of solvents, and to produce a product having a firmly adherent film on the surface.

This invention is especially applicable to the gelled plasticized polyvinyl halides described in Patent No. 1,929,453 issued to Waldo L. Semon. Since they are of the greatest importance the invention will be described with reference to plasticized gamma polyvinyl chlorides, though other polyvinyl halides may be used.

Paper has usually been coated by means of a hot solution of plasticized polyvinyl chloride. This had many disadvantages. It was extremely difficult to obtain enough penetration to assure adhesion of the film to the paper without saturating the paper with the solution. It was practically impossible to obtain a uniform, adherent film of any desired thickness upon the surface of the paper, particularly if a very thin film was desired. Combined with these difficulties was the added disadvantage of the expense occasioned by the inevitable waste of solvents. Attempts to prepare coated paper by heating paper and a layer of film in a press have also resulted in a product in which the paper was saturated with the film or at least permeated to a considerable distance.

The invention may be better understood by reference to the accompanying drawing, of which Fig. 1 is an elevation, partly broken away and in section, of apparatus for carrying out the method of the invention, Fig. 2 is a perspective view of the film coated paper produced by the method of the invention, one corner of the film being separated from the paper and Fig. 3 is a section taken along 3—3 of Fig. 2.

Referring to Fig. 1, any desired paper 10 is fed from a roll supported by the frame 11 through the heated rollers 12, 12. Plasticized gamma polyvinyl chloride 13 is sheeted out between the heated rollers 14 and 15. Between the roller 15 and the heated roller 16, the sheet 13 is calendered onto the paper 10, a small rolling bank 17 of the plasticized vinyl chloride being preferably maintained. As can be seen by reference to Figs. 2 and 3, the paper 10 is not saturated by the film 13. When they are separated as in Fig. 2, a thin layer of paper fibers adheres to the film, but none of the polyvinyl chloride remains on the paper.

It can be readily seen that by adjusting the spacing between the rolls 15 and 16, any desired thickness of film can be uniformly applied, thickness as small as .001 inch being obtainable.

If adhesion between the paper and the film is immaterial, the paper need not be heated before the film is applied. When the paper is not preheated, the film adheres satisfactorily, but the film and the paper may be separated without tearing the paper. By preheating the paper, however, the adhesion between the film and the paper is so great that it is impossible to pull them apart without tearing the paper. The temperature to which the paper is heated depends upon the degree of adhesion desired, 220° F. being usually satisfactory. If the paper is heated nearly to the scorching point, the film will permeate farther into the paper.

The temperature of the calender rolls depends somewhat upon the composition of the film to be applied to the paper. For compositions containing from 40% to 50% plasticizer, I usually heat the top roll 14 to about 230° F., and the bottom rolls 15 and 16 to about 240° F.

A wide variety of plasticizers including tricresyl phosphate, triethyl citrate, butyl phthalyl butyl glycollate, dibutyl phthalate, and other sufficiently non-volatile materials may be used in making up the polyvinyl chloride compositions. Zinc oxide, barytes, carbon black, clay, and other pigments and fillers commonly used in the rubber industry may also be included in the polyvinyl chloride compositions.

The character of the film firmly adhered to the surface of the paper adapts the product to a variety of uses. It is unaffected by contact with water, grease, oil, solvents, halogens, non-oxidizing acids, alkali, oxygen, ozone, and is practically impenetrable by air and other gases. The products therefore may be used for packaging foodstuffs, chemicals, medicinals, oils, etc., and as gasket material. The film is as resistant to flexcracking as the paper, and flexing will not cause separation of the paper and the film. The film is much less inflammable than the paper to which it is attached. The tear resistance of the product, even though not more than .001 inch of film has been added, is greatly increased. If a non-toxic, odorless plasticizer such as triethyl citrate is used, the products of this invention may be used in practically any application where a waterproof, oilproof, grease proof, or air tight sheet is required.

Although I have herein described specific embodiments of my invention, I do not intend to confine myself solely thereto, since many modifications are within the spirit and scope of my invention as defined in the appended claim.

I claim:

A composite article comprising paper having on its surface a uniform adherent film of gelled plasticized gamma polyvinyl chloride adherently calendered thereto.

JOHN H. SEATON.